J. D. HAVIS.
Seed-Planter.
No. 15,974.
Patented Oct. 28, 1856.
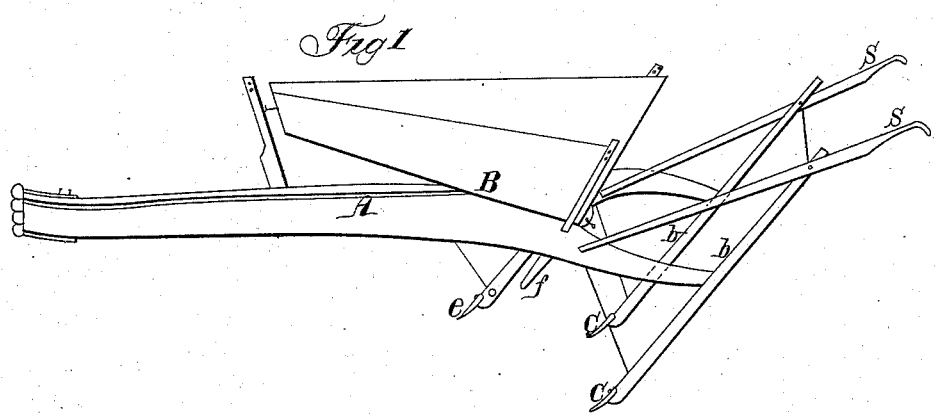
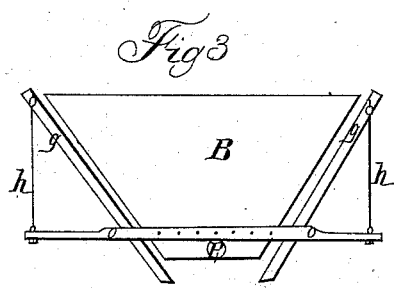
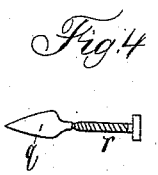
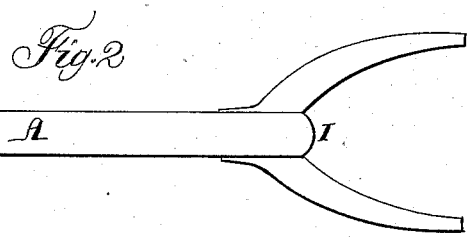

UNITED STATES PATENT OFFICE.

JESSE D. HAVIS, OF PERRY, GEORGIA.

IMPROVEMENT IN SEED-PLANTERS.

Specification forming part of Letters Patent No. 15,974, dated October 28, 1856.

*To all whom it may concern:*

Be it known that I, JESSE D. HAVIS, of Perry, in the county of Houston and State of Georgia, have invented a new and useful Machine for Planting Cotton, Rice, and Wheat, called "Seed-Planter," of which the following is a full and exact description.

This seed-planter is so constructed that the necessity of a wheel is entirely obviated, which is the great object of the invention, and is made of several pieces of wood framed together and secured and strengthened by bolts or rods. The principal piece is the beam represented in Figure 2, letter A, of form and size similar to the common plow-beam, with the exception of a fork on the back end, upon the prongs of which is secured two pieces of wood, represented by letters $b\,b$ in Fig. 1, upon the feet of which are secured two small scooter-plows, $c\,c$, and upon the upper end of which are secured the handles $s\,s$. A little forward of the fork, on the under side of the beam, is set a piece of wood, $d$, which carries the opener $e$, which is a plow much the same shape and form of the others, marked $c\,c$, but is some larger and opens the furrow which receives the seed, and is covered by the small plows in the rear, making a small furrow on each side of the one in which the seed is deposited, and thus covering.

Immediately back of the plow $e$ is attached to the beam in the fork a spout or conductor, $f$, which deposits the seed immediately back of the opener into the furrow. The upper end of this spout is represented in drawing, Fig. 2, letter I, into which the seed falls from the hopper B, which is set directly over the beam, and is made very beveling and larger at the back end, with the bottom on the principle of an inclined plane, thus causing the seed to work down to the lowest point by the motion of the machine. At the lowest point, and in the back end of the hopper, is a hole, Fig. 3, letter P, through which the seed passes into the spout. This hopper is made to work or vibrate in and between three posts, $g\,g\,g$, set in the beam and forks on the same bevel with the hopper, and upon which the hopper is hung or suspended by a joint of iron on the forward post and by rods to the upper end of the back posts, represented in Fig. 3 and letters $h\,h$. This drawing represents the back view of the hopper and posts $g\,g$ at the side of the hopper, and also the space between the hopper and posts. It also shows a piece of wood across and firmly attached to the hopper, (which is not seen in drawing, Fig. 1,) and through the ends of which the rods $h\,h$ are fastened by a joint, thus supporting and giving the hopper a chance to vibrate between the posts $g\,g$. The hopper may be regulated by means of nuts on the rods which support the hopper. Fig. 4 is a tapering pin attached to a screw, $r$, which passes through the upper part of the spout, which drives the pin $q$ into the hole P in hopper or draws it out, so that the space may be made greater or less, thus giving the quantity of seed desired.

What I claim as new, and desire to secure by Letters Patent, is—

The vibrating hopper B, in combination with the pin $q$, constructed and arranged substantially in the manner and for the purpose set forth.

In witness whereof I have hereunto subscribed my name the 2d day of September, 1856.

JESSE D. HAVIS.

In presence of—
R. U. BASKIN,
JOHN KLOCK.